United States Patent
Zhang

(10) Patent No.: US 9,965,084 B2
(45) Date of Patent: May 8, 2018

(54) DRIVING METHOD OF TOUCH SCREEN, TOUCH SCREEN AND DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventor: Dayu Zhang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 170 days.

(21) Appl. No.: 14/890,363

(22) PCT Filed: Apr. 17, 2015

(86) PCT No.: PCT/CN2015/076907
§ 371 (c)(1),
(2) Date: Nov. 10, 2015

(87) PCT Pub. No.: WO2016/095385
PCT Pub. Date: Jun. 23, 2016

(65) Prior Publication Data
US 2016/0357307 A1    Dec. 8, 2016

(30) Foreign Application Priority Data
Dec. 18, 2014  (CN) .......................... 2014 1 0802572

(51) Int. Cl.
*G06F 3/041*  (2006.01)
*G06F 3/044*  (2006.01)

(52) U.S. Cl.
CPC ............ *G06F 3/0416* (2013.01); *G06F 3/044* (2013.01); *G06F 3/0412* (2013.01); *G06F 2203/04104* (2013.01)

(58) Field of Classification Search
None
See application file for complete search history.

(56) References Cited

U.S. PATENT DOCUMENTS

2013/0201154 A1* 8/2013 Yun .......................... G06F 3/044
                                                         345/174
2013/0321325 A1* 12/2013 Jo .......................... G06F 3/0416
                                                        345/174
(Continued)

FOREIGN PATENT DOCUMENTS

CN    101571781 A    11/2009
CN    102253772 A    11/2011
(Continued)

OTHER PUBLICATIONS

First Chinese Office Action dated Dec. 30, 2016; Appln. No. 201410802572.1.
(Continued)

*Primary Examiner* — Nicholas Lee
(74) *Attorney, Agent, or Firm* — Ladas & Parry LLP

(57) ABSTRACT

There are disclosed a driving method of a touch screen, the touch screen and a display apparatus. The driving method comprises: taking at least two touch signal lines as a group and charging node capacitors included in each group of touch signal lines sequentially; discharging the node capacitors included in each touch signal line of the group of touch signal lines through the respective sense signal lines sequentially and determining capacitance value of each node capacitor; and determining coordinates of touch points on the touch screen according to determined capacitance value of each node capacitor. Thus, the node capacitors included
(Continued)

in a group of touch signal lines on the touch screen are charged simultaneously by taking a group as a unit. Compared with a traditional touch screen that charges the node capacitor in only one touch signal line at each time, the driving method saves the charging time of the touch signal lines on the entire touch screen effectively, meanwhile can increase the charging time of each group of touch signal lines, and further can increase the charging time of the node capacitors included in respective touch signal lines, so that the touch screen is capable of tolerating a greater RC delay value.

20 Claims, 5 Drawing Sheets

(56) References Cited

U.S. PATENT DOCUMENTS

2014/0078097 A1   3/2014   Shepelev et al.
2015/0054754 A1*  2/2015   Han .................. G06F 3/044
                                                      345/173

FOREIGN PATENT DOCUMENTS

| CN | 102339178 A | 2/2012 |
| CN | 103348309 A | 10/2013 |
| CN | 103576999 A | 2/2014 |
| CN | 104156129 A | 11/2014 |
| CN | 104484084 A | 4/2015 |
| CN | 204256714 U | 4/2015 |

OTHER PUBLICATIONS

International Search Report and Written Opinion dated Aug. 5, 2015; PCT/CN2015/076907.

The Second Chinese Office Action dated Jun. 8, 2017; Appln. No. 201410802572.1.

* cited by examiner

DRIVING METHOD OF TOUCH SCREEN, TOUCH SCREEN AND DISPLAY APPARATUS

TECHNICAL FIELD

The present disclosure relates to a driving method of a touch screen, a touch screen, and a display apparatus.

BACKGROUND

As display technology develops quickly, a touch screen has already pervaded people's life gradually. At present, the existing capacitive in cell touch screen supports a multi-touch function, has a higher light transmittance and a lower total power consumption, and its contact surface has a high scale of hardness and service life is long.

For example, a projected capacitive touch mainly utilizes capacitive sensing formed due to a contact between transparent electrodes on the touch screen and fingers of humans or conductive objects, and converts into coordinate files available for a touch system to judge by controlling operations of an integrated circuit chip. In the configuration of the projected capacitive touch screen, the transparent electrodes, i.e., touch-driven electrodes and touch-sensed electrodes, are arranged in a manner of interleaved X and Y axes. These transparent electrodes are connected in the surrounding area of the touch screen through a sensing channel of a metal wire and a control chip. When no touch occurs, each of the transparent electrodes has a fixed capacitance value, i.e., a parasitic capacitance. When a touch occurs, there is a sense between the conductive objects and the transparent electrodes to form a coupling capacitance, and a sensing capacitance value measured by the control chip is no longer the original fixed capacitance value. Therefore, according to a change of the measured capacitance value, a coordinate position of a touch point can be calculated. A self-capacitive touch determines a position of the touch point by sensing a change of a capacitance value between each node and the ground, while a mutual-capacitive touch determines the position of the touch point by sensing a change of a capacitance value between X and Y axes of each node.

In general, the touch function of the capacitive in cell touch screen is implemented through a touch driving circuit in the touch screen. The known touch driving circuit outputs a touch driving signal to a touch driving electrode at each time. This touch driving signal controls the touch driving electrode to charge a capacitance of a corresponding node, and at the same time the touch sensing electrode senses a change of a capacitance value of the corresponding node, so as to determine the position of the touch point. However, as a touch display screen becomes popular, a problem of an excessive RC delay would occur in a large-size touch display screen at present, that is, when the touch driving circuit charges the node, a node capacitor C would increase continuously as the number of the touch points increases, and a resistance value R would increase continuously as a distance of the touch driving node increases. Therefore, in the process of touch driving of the touch screen, the corresponding RC delay would increase gradually, and when the increase of the RC delay exceeds one fifth of scanning time of the gate-integrated driving circuit, the problem that the touch points cannot be calculated correctly would occur.

Therefore, how to reduce the RC delay of touch driving of the touch screen and ensure the correct determination of the position of the touch points is a problem to be solved urgently by those skilled in the art.

SUMMARY

There are provided a driving method of a touch screen, a touch screen and a display apparatus in embodiments of the present disclosure.

There is provided a driving method of a touch screen according to an embodiment of the present disclosure, the touch screen having a plurality of touch signal lines and sense signal lines arranged crosswise and insulated from each other, node capacitors formed at overlapping positions of the touch signal lines and the sense signal lines, comprising following steps:

taking at least two touch signal lines as a group and charging node capacitors included in each group of touch signal lines sequentially;

after charging the node capacitors included in each group of touch signal lines is completed, discharging the node capacitors included in each touch signal line of the group of touch signal lines through the respective sense signal lines sequentially and determining a capacitance value of each node capacitor; and determining a coordinate of a touch point on the touch screen according to a determined capacitance value of each node capacitor.

In a possible implementation, in the driving method of the touch screen provided in the embodiment of the present disclosure, taking at least two touch signal lines as a group and charging a node capacitor included in each group of touch signal lines sequentially can comprise: taking at least two neighboring touch signal lines as a group and charging the node capacitor included in each group of touch signal lines sequentially.

In a possible implementation, in the driving method of the touch screen provided in the embodiment of the present disclosure, taking at least two touch signal lines as a group and charging a node capacitor included in each group of touch signal lines sequentially can comprise:

taking all the touch signal lines of the touch screen as a group and charging node capacitors included in all the touch signal lines simultaneously.

In a possible implementation, in the driving method of the touch screen provided in the embodiment of the present disclosure, after charging the node capacitor included in each group of touch signal lines is completed, discharging the node capacitor included in each touch signal line of the group of touch signal lines through the respective sense signal lines sequentially and determining a capacitance value of each node capacitor can comprise:

after charging the node capacitor included in each group of touch signal lines is completed, connecting the node capacitor included in each touch signal line of the group of touch signal lines and a corresponding sense driving module through the respective sense signal lines sequentially, recording a number of signals outputted by the sense driving module when each node capacitor is discharged, and determining a capacitance value of each node capacitor according to the number of the signals outputted.

In a possible implementation, in the driving method of the touch screen provided in the embodiment of the present disclosure, determining a coordinate of a touch point on the touch screen according to a determined capacitance value of each node capacitor can comprise:

judging whether the determined capacitance value of each node capacitor is within a threshold range; and if it is not within the threshold range, then determining that a touch occurs at a coordinate position of the node capacitor and outputting the coordinate of the node capacitor wherein the touch occurs as the coordinate of the touch point.

There is provided a touch screen in an embodiment of the present disclosure, comprising: a plurality of touch signal lines and sense signal lines arranged crosswise and insulated from each other; a touch driving module connected to each of the touch signal lines; a sense driving module connected to each of the sense signal lines; and a touch point determining module configured to determine a coordinate of a touch point, wherein forming a node capacitor at an overlapping position of the touch signal lines and the sense signal lines;

the touch driving module configured to take at least two touch signal lines as a group and charge a node capacitor included in each group of touch signal lines sequentially;

the sense driving module configured to, after charging the node capacitor included in each group of touch signal lines is completed, discharge a node capacitor included in each touch signal line of the group of touch signal lines through the respective sense signal lines sequentially and determine a capacitance value of each node capacitor; and the touch point determining module configured to determine a coordinate of a touch point on the touch screen according to a determined capacitance value of each node capacitor.

In a possible implementation, in the touch screen provided in the embodiment of the present disclosure, the touch driving module comprises a plurality of touch driving sub-modules each of which is connected to at least two neighboring touch signal lines corresponding thereto respectively;

Each of the touch driving sub-modules is configured to charge a node capacitor included in each touch signal line connected.

In a possible implementation, in the touch screen provided in the embodiment of the present disclosure, the sense driving module comprises a plurality of sense driving sub-modules corresponding to each node capacitor in each sense signal line one by one;

Each of the sense driving sub-modules comprises: a first switch unit, a discharging unit, a comparing unit and a counting unit;

An input terminal of the first switch unit is connected to a corresponding sense signal line, and an output terminal thereof is connected to a first terminal of the discharging unit and a first input terminal of the comparing unit. The first switch unit is configured to connect the node capacitor and the discharging unit through the sense signal lines when the node capacitor connected to the corresponding sense signal line is discharged, so that the node capacitor charges the discharging unit;

A second terminal of the discharging unit is connected to a low level signal terminal, and a third terminal thereof is connected to an output terminal of the counting unit;

A second input terminal of the comparing unit is connected to a reference voltage terminal, and an output terminal thereof is connected to an input terminal of the counting unit. The comparing unit is configured to control the discharging unit to discharge to a ground and output a signal to the counting unit when a voltage of the charging unit reaches a voltage of the reference voltage terminal;

An output terminal of the counting unit is connected to an input terminal of the touch point determining module. The counting unit is configured to determine a capacitance value of the node capacitor according to the recorded number of signals outputted by the comparing unit and output a determined capacitance value of the node capacitor to the touch point determining module.

In a possible implementation, in the touch screen provided in the embodiment of the present disclosure, the discharging unit comprises: a discharging capacitance, a voltage dividing resistance and a second switch unit;

One terminal of the discharging capacitance is connected to the output terminal of the first switch unit, the first input terminal of the comparing unit and one terminal of the voltage dividing resistance, and the other terminal thereof is connected to the low level signal terminal;

The other terminal of the voltage dividing resistance is connected to a first terminal of the second switch unit;

A second terminal of the second switch unit is connected to the output terminal of the counting terminal, and a third terminal thereof is connected to the low level signal terminal. The second switch unit is configured to connect one terminal of the voltage dividing resistance and the output terminal of the counting unit when the node capacitor is discharged and connect one terminal of the voltage dividing resistance and the low level signal terminal when the discharging unit is reset.

In a possible implementation, in the touch screen provided in the embodiment of the present disclosure, the touch point determining module is configured to judge whether the determined capacitance value of each node capacitor is within a threshold range; and if it is not within the threshold range, then determining that a touch occurs at a coordinate position of the node capacitor and outputting a coordinate of the node capacitor where the touch occurs as a coordinate of the touch point.

There is provided a display apparatus in an embodiment of the present disclosure, comprising the touch screen provided in the embodiment of the present disclosure.

There are provided the driving method of the touch screen, the touch screen and the display apparatus in the embodiments of the present disclosure. The touch signal lines on the touch screen are grouped, at least two touch signal lines are taken as a group, and a node capacitor included in each group of touch signal lines is charged sequentially. After charging the node capacitor included in each group of touch signal lines is completed, a node capacitor included in each touch signal line of the group of touch signal lines is discharged through the respective sense signal lines sequentially and a capacitance value of each node capacitor is determined. A coordinate of a touch point on the touch screen is determined according to the determined capacitance value of each node capacitor. In this way, the node capacitors included in a group of touch signal lines on the touch screen are charged simultaneously by taking a group as a unit. Compared with a traditional touch screen that charges the node capacitor in only one touch signal line at each time, the present disclosure can save the charging time of the touch signal lines on the entire touch screen effectively, meanwhile can increase the charging time of each group of touch signal lines, and further can increase the charging time of the node capacitor included in each touch signal line, so that the touch screen is capable of tolerating a greater RC delay value, and thus it is ensured the touch screen is capable of determining the position of the touch point correctly.

DETAILED DESCRIPTION

Specific implementations of a driving method of a touch screen, a touch screen and a display apparatus provided in embodiments of the present disclosure will be described in detail by combining with figures.

Figure 1:
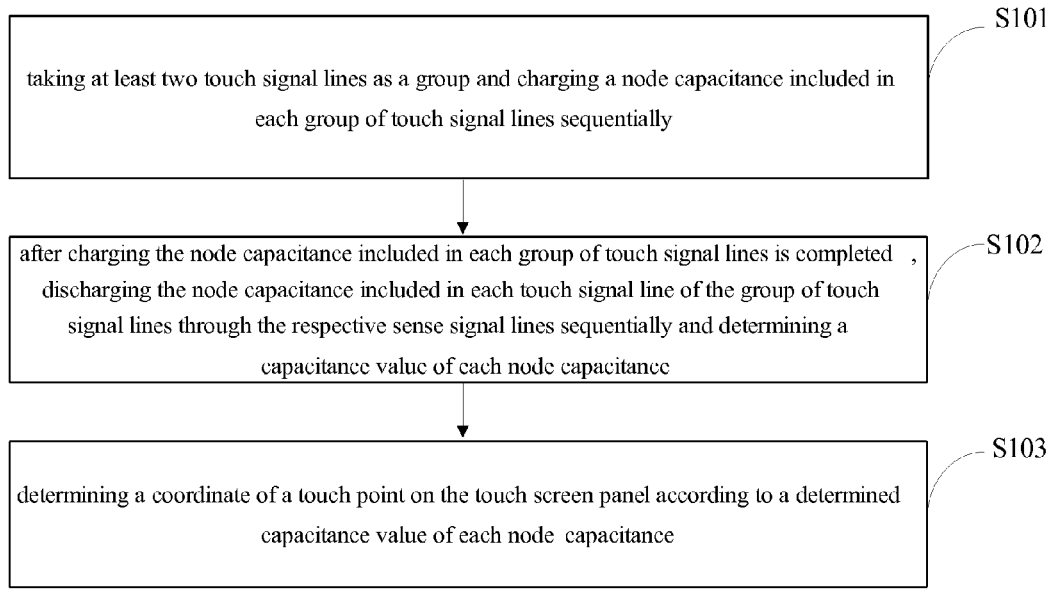
FIG. 1 is a flow diagram of a driving method of a touch screen provided in an embodiment of the present disclosure.

FIG. 1 shows a flow diagram of a driving method of a touch screen provided in an embodiment of the present disclosure. The touch screen has a plurality of touch signal lines and sense signal lines arranged crosswise and insulated from each other and a node capacitor is formed at an overlapping position of the touch signal lines and the sense signal lines.

As shown in FIG. 1, the driving method of the touch screen can comprise following operating processes:

in Step S101, taking at least two touch signal lines as a group and charging node capacitors included in each group of touch signal lines sequentially;

in Step S102, discharging the node capacitors included in each touch signal line of the group of touch signal lines through the respective sense signal lines sequentially and determining a capacitance value of each node capacitor after the charging of the node capacitor included in each group of touch signal lines is completed; and in Step S103, determining coordinates of touch points on the touch screen according to the determined capacitance values of respective node capacitors.

In the driving method of the touch screen provided in the embodiment of the present disclosure, the touch signal lines on the touch screen can be grouped, at least two touch signal lines are taken as a group, and the node capacitors included in each group of touch signal lines are charged sequentially. After the charging of the node capacitors included in each group of touch signal lines is completed, a node capacitor included in each touch signal line of the group of touch signal lines is discharged through the respective sense signal lines sequentially and a capacitance value of each node capacitor is determined. A coordinate of a touch point on the touch screen is determined according to the determined capacitance value of each node capacitor. In this way, the node capacitors included in a group of touch signal lines on the touch screen are charged simultaneously by taking a group as a unit. Compared with a traditional touch screen that charges the node capacitor in only one touch signal line at each time, the present disclosure can save the charging time of the touch signal lines on the entire touch screen effectively, meanwhile can increase the charging time of each group of touch signal lines, and further can increase the charging time of the node capacitor included in each touch signal line, so that the touch screen is capable of tolerating a greater RC delay value, and thus it is ensured the touch screen is capable of determining the position of the touch point correctly.

Alternatively, in the driving method of the touch screen provided in the embodiment of the present disclosure, taking at least two touch signal lines as a group and charging node capacitors included in each group of touch signal lines sequentially can comprise: taking at least two neighboring touch signal lines as a group and charging the node capacitors included in each group of touch signal lines sequentially. In this way, the at least neighboring touch signal lines are taken as a group, and the node capacitors included in each group of the touch signal lines are charged sequentially, which can save the charging time of the touch signal lines on the entire touch screen effectively, meanwhile can increase the charging time of each group of touch signal lines, and further can increase the charging time of the node capacitor included in each touch signal line, so that the touch screen is capable of tolerating a greater RC delay value, and thus it is ensured the touch screen is capable of determining the position of the touch point correctly.

Alternatively, in the driving method of the touch screen provided in the embodiment of the present disclosure, the process of taking at least two touch signal lines as a group and charging the node capacitors included in each group of touch signal lines sequentially can further comprise: taking all touch signal lines of the touch screen as a group and charging node capacitors included in all touch signal lines simultaneously. In this way, all the touch signal lines on the entire touch screen are taken as a group, and at the same time the node capacitors included in all the touch signal lines are charged simultaneously, which can save the charging time of the touch signal lines on the entire touch screen to the largest extent, meanwhile can increase the charging time of each group of touch signal lines to the largest extent, and further can increase the charging time of the node capacitor included in each touch signal line, so that the touch screen is capable of tolerating a maximum RC delay value, and thus it is ensured the touch screen is capable of determining the position of the touch point correctly.

Alternatively, in the driving method of the touch screen provided in the embodiment of the present disclosure, after the charging of the node capacitors included in each group of touch signal lines is completed, discharging the node capacitors included in each touch signal line of the group of touch signal lines through each of the sense signal lines sequentially and determining a capacitance value of each node capacitor can comprise: after the charging of the node capacitors included in each group of touch signal lines is completed, connecting the node capacitor included in each touch signal line of the group of touch signal lines with a corresponding sense driving module through the respective sense signal lines sequentially, recording the number of signals outputted by the sense driving module when each node capacitor is discharged, and determining the capacitance value of each node capacitor according to the number of the signals outputted.

Specifically, in the driving method of the touch screen provided in the embodiment of the present disclosure, after the charging of the node capacitor included in each group of the touch signal lines is completed, it needs to discharge the charged node capacitor. Therefore, the node capacitor included in each touch signal line in the group of touch signal lines and the corresponding sense driving module can be connected subsequently through the respective sense signal lines, and the respective node capacitors are discharged through the sense driving module. In this process, the number of signals outputted by the respective sense driving modules when each node capacitor is discharged is recorded, the capacitance value of each node capacitor according to the number of the signals outputted is determined, that is, at a position where a touch occurs, the capacitance value of a corresponding node capacitor Cs would change, and the number of signals outputted would change when the corresponding node capacitor Cs is discharged.

Figure 2A:
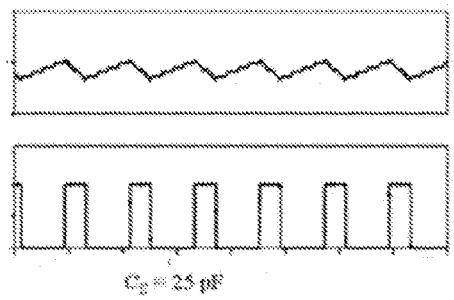
FIGS. 2a and 2b are schematic diagrams of waveforms of signals outputted by a sense driving module when a node capacitor is 25 PF and 50 PF respectively provided in an embodiment of the present disclosure.
Figure 2B:
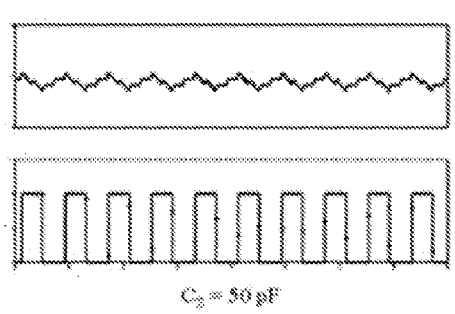

FIGS. 2a and 2b shows respectively schematic diagrams of waveforms of signals outputted by a sense driving module when a node capacitor is 25 PF and 50 PF provided in an embodiment of the present disclosure. As shown in FIGS. 2a and 2b, when the node capacitor Cs is 25 PF and 50 PF respectively, the number of signals outputted by the sense driving module, i.e., the number of high levels in the waveforms as shown in FIGS. 2a and 2b, is different. Therefore, the respective sense driving modules can calculate the capacitance values of the respective nodes according to the number of signals outputted.

Alternatively, in the driving method of the touch screen provided in the embodiment of the present disclosure, after the charging of the node capacitors included in each group of touch signal lines is completed, the process of discharging the respective node capacitors included in the plurality of charged touch signal lines of the group through their respective corresponding sense signal lines sequentially, determining the capacitance values of the respective node capacitors according to the number of signals outputted in the process of discharging, and determining coordinates of touch points on the touch screen according to the determined capacitance values of the respective node capacitors can comprise: judging whether the determined capacitance value of each node capacitor is within a threshold range; and if it is not within the threshold range, then determining that a touch occurs at a coordinate position of the node capacitor and outputting a coordinate of the node capacitor where the touch occurs as a coordinate of the touch point. That is, when a node capacitor pm a touch signal line is discharged, a vertical coordinate of the touch signal line is a vertical coordinate of each node capacitor, and a horizontal coordinate of a sense signal line corresponding to each node capacitor is a horizontal coordinate of each node capacitor. In this way, the position of the touch point where the touch occurs can be judged by judging whether the determined capacitance value of each node capacitor is within a preset threshold range, that is, the position of the node capacitor whose capacitance value is not within the preset threshold range is the position of the touch point where the touch occurs, and the coordinate of the node capacitor is the coordinate of the touch point where the touch occur.

Figure 3:
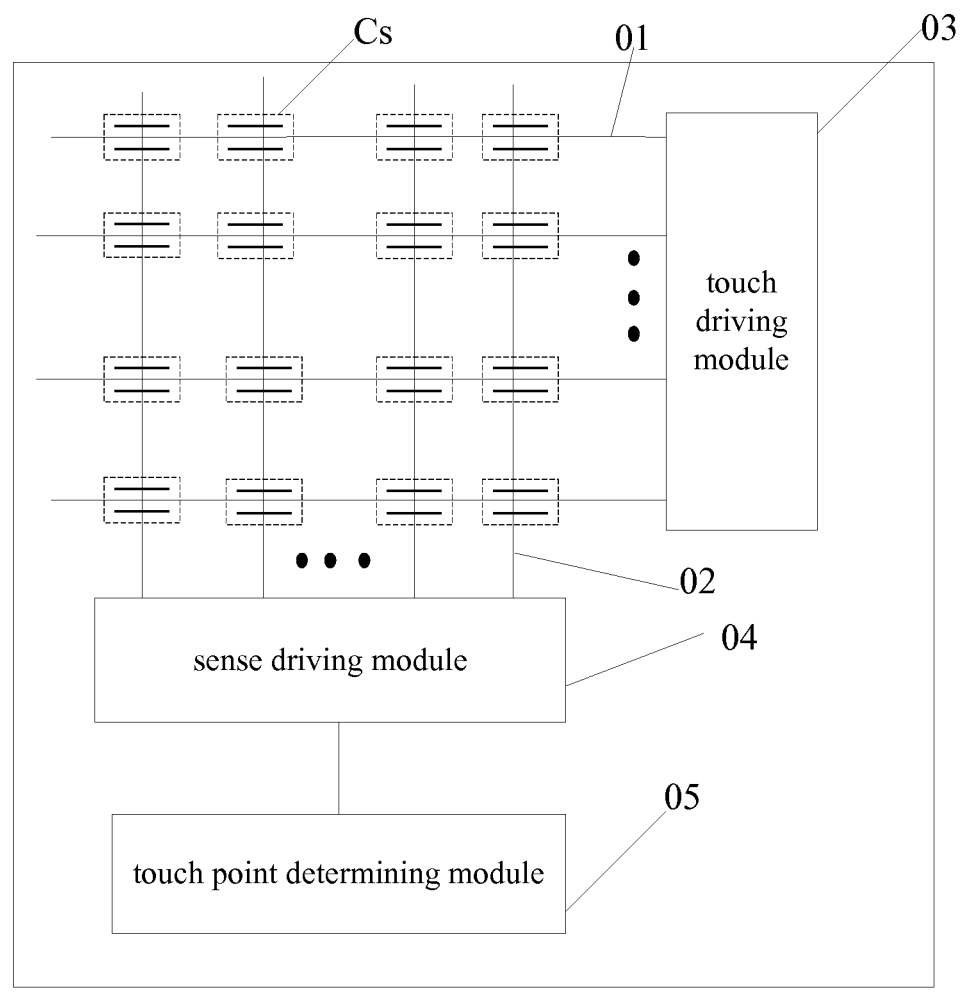
FIG. 3 is one schematic diagram of a configuration of a touch screen provided in an embodiment of the present disclosure.

FIG. 3 is one schematic diagram of a configuration of a touch screen provided in an embodiment of the present disclosure. As shown in FIG. 3, based on the same inventive concept as the driving method of the touch screen described above, the touch screen provided in the embodiment of the present disclosure can comprise: a plurality of touch signal lines 01 and sense signal lines 02 arranged crosswise and insulated from each other; a touch driving module 03 connected to the respective touch signal lines 01; a sense driving module 04 connected to the respective sense signal lines 02; and a touch point determining module 05 configured to determine coordinates of touch points.

A node capacitor Cs is formed at an overlapping position of the touch signal lines 01 and the sense signal line 02.

The touch driving module 03 is configured to take at least two touch signal lines 01 as a group and charge the node capacitors Cs included in each group of touch signal lines 01.

The sense driving module 04 is configured to, after the charging of the node capacitors Cs included in each group of touch signal lines is completed, discharge the node capacitor Cs included in each touch signal line 01 in the group of touch signal lines 01 through the respective sense signal lines 02 sequentially and determine a capacitance value of each node capacitor Cs.

The touch point determining module 05 is configured to determine a coordinates of touch points on the touch screen according to the determined capacitance values of the respective node capacitors Cs.

Specifically, in the touch screen provided in the embodiment of the present disclosure, by taking at least two touch signal lines 01 as a group, the touch driving module 03 is configured to charge the node capacitor Cs included in each group of touch signal lines 01 sequentially. After the charging of the node capacitor Cs included in each group of touch signal lines is completed, the sense driving module 04 is configured to discharge the node capacitor Cs included in each touch signal line 01 in the group of touch signal lines 01 through the respective sense signal lines 02 sequentially and determine the capacitance value of each node capacitors Cs. The touch point determining module 05 is configured to determine coordinates of touch points on the touch screen according to the determined capacitance value of each node capacitor. In this way, the node capacitors Cs included in a group of touch signal lines 01 on the touch screen are charged simultaneously by taking a group as a unit. Compared with a traditional touch screen that charges the node capacitor Cs in only one touch signal line at each time, the touch screen provided in the embodiment of the present disclosure can save the charging time of the touch signal lines 01 on the entire touch screen effectively, meanwhile can increase the charging time of each group of touch signal lines 01, and further can increase the charging time of the node capacitor Cs included in each touch signal line 01, so that the touch screen is capable of tolerating a greater RC delay value, and thus it is ensured the touch screen is capable of determining the position of the touch point correctly.

Figure 4:
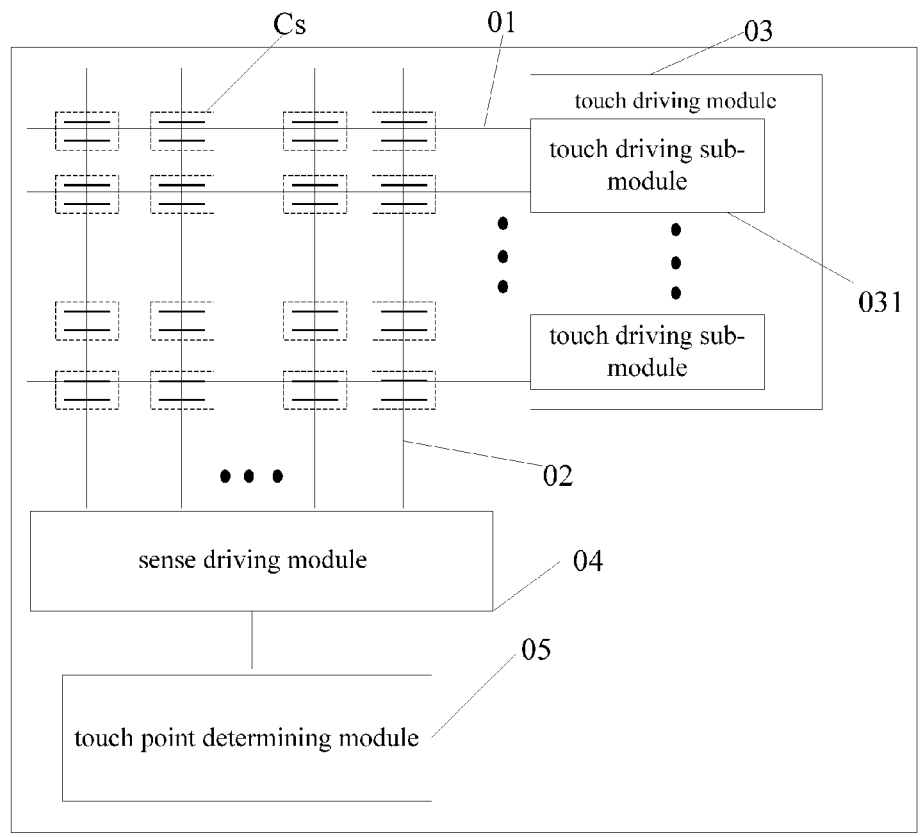
FIG. 4 is another schematic diagram of a configuration of a touch screen provided in an embodiment of the present disclosure.

FIG. 4 shows another schematic diagram of a configuration of a touch screen provided in an embodiment of the present disclosure.

As shown in FIG. 4, alternatively, in the touch screen provided in the embodiment of present disclosure, the touch driving module can comprise a plurality of touch driving sub-modules 031 each of which is connected to at least two neighboring touch signal lines 01 corresponding thereto; each driving sub-module 031 is configured to charge the node capacitor Cs included in each connected touch signal line 01. In this way, the at least two neighboring touch signal lines 01 are taken as a group, and the node capacitor Cs included in each group of touch signal lines 01 are charged sequentially through the respective touch driving sub-modules 031. In this way, the charging time of the touch signal lines 01 on the entire touch screen can be saved effectively, and meanwhile the charging time of each group of touch signal lines 01 can be increased, and further the charging time of the node capacitor Cs included in each touch signal line 01 can be increased, so that the touch screen is capable of tolerating a greater RC delay value, and thus it is ensured the touch screen is capable of determining the position of the touch point correctly.

Returning to FIG. 3 again, as shown in FIG. 3, alternatively, in the touch screen provided in the embodiment of the present disclosure, the touch driving modules may comprise only one touch driving module. The touch driving module is connected to all the touch signal lines 01 in the touch screen. All the touch signal lines 01 in the touch screen are taken as a group, and the touch driving module charges the node capacitors Cs included in all the touch signal lines 01 in the touch screen simultaneously. In this way, all the touch signal lines 01 on the entire touch screen are taken as a group, and the node capacitors Cs included in all the touch signal lines 01 are charged simultaneously through the touch driving module 03, which can save the charging time of the touch signal lines 01 on the entire touch screen to the largest extent, meanwhile can increase the charging time of each group of touch signal lines 01 to the largest extent, and further can increase the charging time of the node capacitor Cs included in each touch signal line 01, so that the touch screen is capable of tolerating a maximum RC delay value, and thus it is ensured the touch screen is capable of determining the position of the touch point correctly.

Specifically, in the touch screen provided in the embodiment of the present disclosure, after the charging of all the touch signal lines 01 on the touch screen is completed, the charged touch signal lines 01 are discharged through the sense signal lines 02 sequentially. When a charged touch signal line 01 is discharged, a vertical coordinate of the touch signal line 01 is a vertical coordinate of each node capacitor Cs included in the touch signal line 01, and a horizontal coordinate of the sense signal line 02 corresponding to each node capacitors Cs is a horizontal coordinate of each node capacitor Cs. In the process of discharging, the capacitance value of each node capacitor Cs is determined by determining the number of signals outputted in the process of discharging of each node capacitor Cs, and it is judged whether a touch occurs at the position of each node capacitor Cs according to the determined capacitance value of each node capacitor Cs; if the capacitance value of the discharged node capacitor Cs is not within the preset threshold range, then a touch occurs at the position of the node capacitor Cs, and the coordinate of the node capacitor Cs where the touch occurs is the coordinate of the touch point where the touch occurs.

Figure 5:
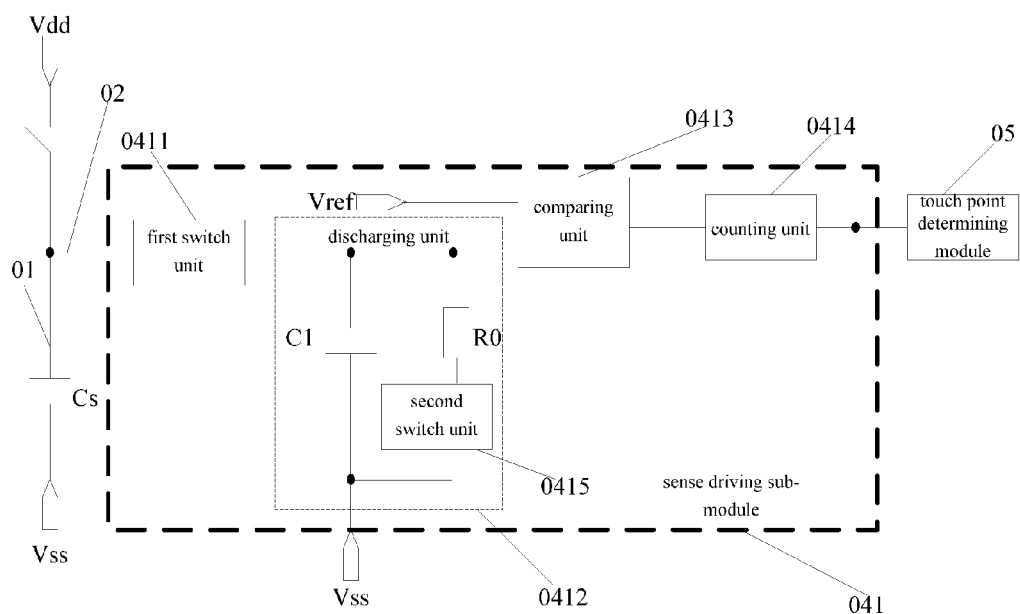
FIG. 5 is a schematic diagram of a configuration of a sense driving sub-module in a touch screen provided in an embodiment of the present disclosure.

FIG. 5 shows a schematic diagram of a configuration of a sense driving sub-module in a touch screen provided in an embodiment of the present disclosure. Alternatively, in the touch screen provided in the embodiment of the present disclosure, the sense driving module 04 can comprise a plurality of sense driving sub-modules 041 corresponding to each node capacitor Cs in each sense signal line 02 one by one.

As shown in FIG. 5, the respective sense driving sub-modules 041 can comprise: a first switch unit 0411, a discharging unit 0412, a comparing unit 0413 and a counting unit 0414.

An input terminal of the first switch unit 0411 is connected to a corresponding sense signal line 02, and an output terminal thereof is connected to a first terminal of the discharging unit 0412 and a first input terminal of the comparing unit 0413. The first switch unit 04111 is configured to connect the node capacitor Cs and the discharging unit 0412 through the sense signal line 02 when the node capacitor Cs connected to the corresponding sense signal line 02 is discharged, so that the discharging unit 0412 is charged by the node capacitor Cs;

A second terminal of the discharging unit 0412 is connected to a low level signal terminal Vss, and a third terminal thereof is connected to an output terminal of the counting unit 0414;

A second input terminal of the comparing unit 0413 is connected to a reference voltage terminal Vref, and an output terminal thereof is connected to an input terminal of the counting unit 0414. The comparing unit 0413 is configured to control the discharging unit 0412 to discharge to a ground and output a signal to the counting unit 0414 when a voltage of the charging unit 0412 reaches a voltage of the reference voltage terminal Vref.

An output terminal of the counting unit 0414 is connected to an input terminal of the touch point determining module 05. The counting unit 0414 is configured to determine a capacitance value of the node capacitor Cs according to the recorded number of signals outputted by the comparing unit 0413 and output the determined capacitance value of the node capacitor Cs to the touch point determining module 05.

Specifically, in the touch screen provided in the embodiment of the present disclosure, after the charging of the node capacitor Cs included in each group of touch signal lines 01 is completed, the first switch unit 0411 connects the node capacitor Cs and the discharging unit 0412 through the sense signal line 02, so that the node capacitor Cs charges the charging unit 0412. When the voltage of the discharging unit 0412 reaches the voltage of the reference voltage terminal Vref, the comparing unit 0413 controls the discharging unit 0412 to discharge to the ground. Through the processes of charging and discharging of the discharging unit 0412, finally the voltage of the corresponding node capacitor Cs is discharged completely. In the process of the node capacitor Cs being discharged through the discharging unit 0412, for each time of discharging of the discharging unit 0412, the comparing unit 0413 would output a signal to the counting unit 0414 one time. The counting unit 0414 can determine the capacitance value of the node capacitor Cs by recording the number of signals outputted in the discharging process of the node capacitor Cs. Then, the determined capacitance value is outputted to the touch point determining module 05. The touch point determining module 05 determines the position of the coordinate of the touch point where the touch occurs according to the determined capacitance value of the node capacitor Cs.

Alternatively, in the touch screen provided in the embodiment of the present disclosure, as shown in FIG. 5, the discharging unit 0412 can comprise: a discharging capacitance C1, a voltage dividing resistance R0 and a second switch unit 0415.

One terminal of the discharging capacitance C1 is connected to the output terminal of the first switch unit 0411, the first input terminal of the comparing unit 0413 and one terminal of the voltage dividing resistance R0, and the other terminal thereof is connected to the low level signal terminal Vss.

The other terminal of the voltage dividing resistance R0 is connected to a first terminal of the second switch unit 0415.

A second terminal of the second switch unit 0415 is connected to the output terminal of the counting terminal 0414, and a third terminal thereof is connected to the low level signal terminal Vss. The second switch unit 0415 is configured to connect one terminal of the voltage dividing resistance R0 and the output terminal of the counting unit 0414 when the node capacitor Cs is discharged and connect one terminal of the voltage dividing resistance R0 and the low level signal terminal Vss when the discharging unit 0412 is reset.

Specifically, in the touch screen provided in the embodiment of the present disclosure, when the node capacitor Cs is discharged, the first switch unit 0411 connects one terminal of the node capacitor Cs with one terminal of the discharging capacitance C1 through the corresponding sense signal line 02, so that the node capacitor Cs charges the discharging capacitance C1. When the voltage of the discharging capacitance C1 reaches the voltage of the reference voltage terminal Vref, the discharging capacitance would discharge to the ground, and at the same time the comparing unit 0413 would output a signal to the counting unit 0414. This process is repeated until the node capacitor Cs is discharged completely. The counting unit 0414 records the number of signals outputted in the discharging process of the node capacitor Cs, and determines the capacitance value of the node capacitor Cs.

In general, as shown in FIG. 5, the comparing unit 0413 can implement its corresponding function through a comparator CMP, and the counting unit 0414 can implement its corresponding function through a latch Latch. The comparing unit 0413 and the counting unit 0414 can also be implemented by other devices that can implement their corresponding functions, to which no limitation is made. After the discharging unit 0412 realizes the complete discharging process of the node capacitor Cs, it needs to be preset before the node capacitor Cs is discharged next time, which can avoid the discharging capacitance C1 from affecting the next time discharging of the node capacitor Cs due to the existed voltage difference. When the discharging unit 0412 is reset, the second switch unit 0415 connects one terminal of the voltage dividing resistance R0 with the low level signal terminal Vss, so that the discharging unit 0412 forms a closed loop, and thus the discharging capacitance C1 is discharged completely.

Alternatively, in the touch screen provided in the embodiment of the present disclosure, the touch point determining module 05 can be configured to judge whether the determined capacitance value of respective node capacitors Cs is within a threshold range; and if it is not within the threshold range, then determining that the touch occurs at the position of the coordinate of the node capacitor Cs and outputting the coordinate of the node capacitor Cs where the touch occurs as the coordinate of the touch point. In this way, after the node capacitor Cs completes the discharging process, the position of the touch point where the touch occurs can be judged by judging whether the determined capacitance value of the node capacitor Cs is within the preset threshold range, that is, the position of the node capacitor Cs whose capacitance value is not within the preset threshold range is the position of the touch point where the touch occurs.

Based on a same inventive concept, there is provided a display apparatus in an embodiment of the present disclosure, comprising the touch screen provided in the embodiment of the present disclosure. This display apparatus can be any product or means having a display function such as a mobile phone, a tablet computer, a television set, a display, a notebook computer, and a navigator and so on. Since the principle of the display apparatus for solving the problem is similar to that of the touch screen, the implementation of the display apparatus can refer to the implementation of the touch screen. Thus, the repeated details are not further provided.

Figure 6:
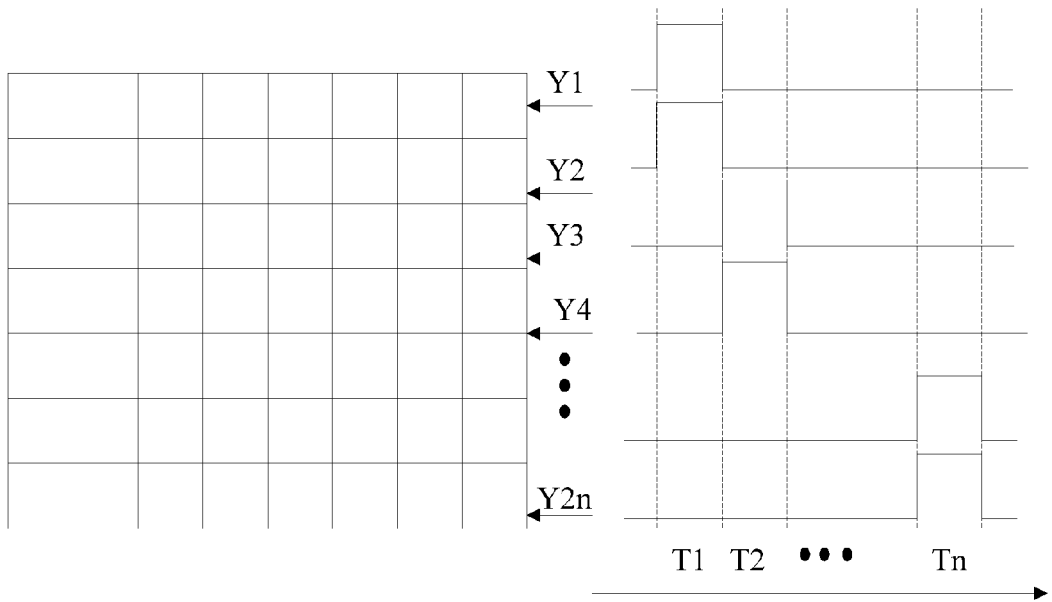
FIG. 6 is a schematic diagram of two neighboring touch signal lines in a touch screen being charged simultaneously provided in an embodiment of the present disclosure.

FIG. 6 shows a schematic diagram of two neighboring touch signal lines in a touch screen being charged simultaneously provided in an embodiment of the present disclosure. As shown in FIG. 6, it is described by taking the two neighboring touch signal lines as a group to be discharged simultaneously. Specifically, in FIG. 6, the two neighboring touch driving signal lines Y1 and Y2 are taken as a group. In a period of time T1, the node capacitors Cs included in the touch signal lines Y1 and Y2 are charged simultaneously. In a next period of time, the node capacitor Cs included in the touch signal line Y2 is maintained unchanged. The respective sense driving sub-modules 041 discharge the node capacitor Cs in the touch signal line Y1 through the corresponding sense signal line 02. Only the discharged capacitance values of respective node capacitors Cs in the touch signal line Y1 are recorded. After discharging of each node capacitor Cs in the touch signal line Y1 is ended, the node capacitor Cs in the touch signal line Y2 is discharged. Then, only the discharged capacitance value of respective node capacitors Cs in the touch signal line Y2 are recorded. The above process is repeated by taking two neighboring touch signal lines as a group until the entire touch screen completes the touch scanning. Herein, in the process of realizing the discharging of the touch signal line, all the node capacitors Cs in a charged touch signal line are discharged through their respective corresponding sense signal lines simultaneously. The vertical coordinate of the touch signal line is the vertical coordinate of each node capacitor Cs in the touch signal line, and the horizontal coordinate of each sense signal line corresponding to each node capacitor Cs is the horizontal coordinate of each node capacitors Cs. The capacitance value of each node capacitors Cs is determined according to the number of signals outputted by each node capacitor Cs in the discharging process. It is judged whether the touch occurs at the position of each node capacitor Cs according to the capacitance value of each node capacitor Cs. The position of the node capacitor Cs which is determined after being discharged and whose capacitance value is not within the preset threshold range is the position where the touch occurs. The coordinate of the node capacitor Cs is the coordinate of the touch point where the touch occurs, and thus the position of the touch point where the touch occurs is determined finally.

Figure 7:
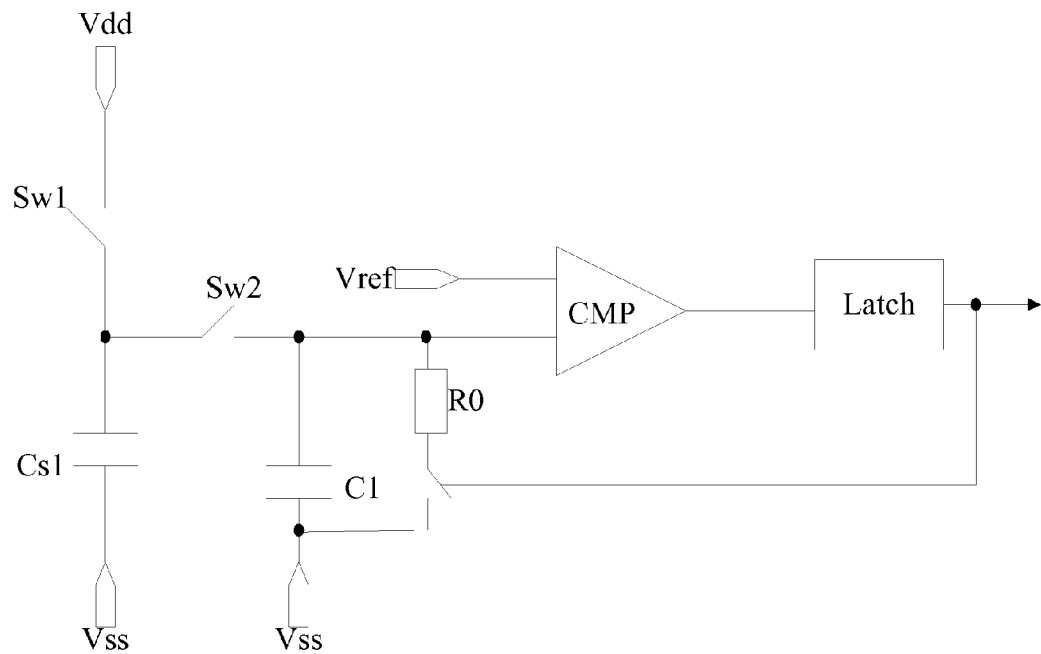
FIGS. 7 and 8 are schematic diagrams of a circuit configuration that two neighboring touch signal lines Y1 and Y2 implement charging and discharging provided in an embodiment of the present disclosure.
Figure 8:
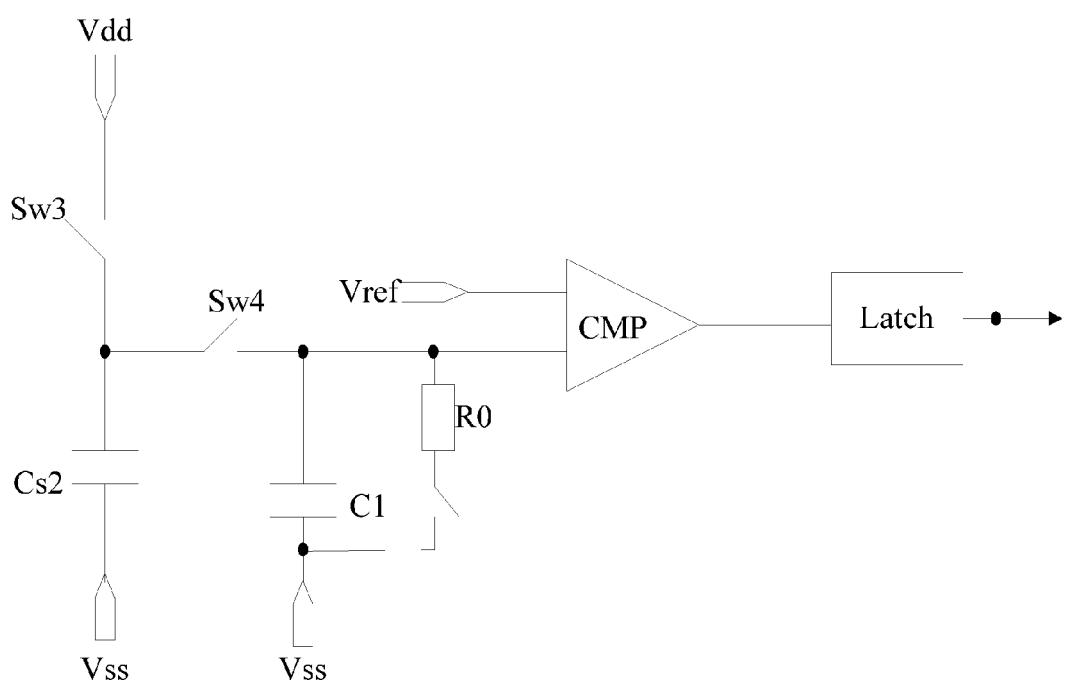

FIGS. 7 and 8 show respectively schematic diagrams of a circuit configuration that two neighboring touch signal lines Y1 and Y2 implement charging and discharging provided in an embodiment of the present disclosure. The process that the touch screen provided in the embodiment of the present disclosure implements touch driving scanning can be described as follows: herein, it is described by taking the charging and discharging processes of a node capacitor in a touch signal line as an example, and can be implemented by using the circuit configurations as shown in FIGS. 7 and 8.

Specifically, FIG. 7 is a schematic diagram of a circuit configuration on the touch signal line Y1 that implements the charging and discharging processes of a node capacitor Cs1, and FIG. 8 is a schematic diagram of a circuit configuration on the touch signal line Y2 that implements the charging and discharging processes of a node capacitor Cs2. The specific implementation mode can be described as follows:

in a first time of period, switches Sw1 and Sw3 are turned off, and switches Sw2 and Sw4 are turned on. At this time, the node capacitors Cs1 and Cs2 in the touch signal lines Y1 and Y2 are charged simultaneously until the node capacitors Cs1 and Cs2 are charged to have a voltage value of the power supply voltage Vdd. Then, it enters into a next phase. In this phase, switches Sw1, Sw3, and Sw4 are turned off, and a switch Sw2 is turned on. At this time, the node capacitor Cs1 charges the discharging capacitor C1. One terminal of the discharging capacitance C1 is connected to one terminal of the comparator CMP, and the other terminal thereof is connected to the ground. The other terminal of the comparator CMP is connected to the reference voltage Vref. When the voltage of the discharging capacitance C1 reaches the voltage of the reference voltage terminal Vref, the discharging capacitance C1 would discharge to the ground. Now, the latch Latch would output a high level signal. This process is repeated until all the charges of the node capacitor Cs1 are released. The capacitance value of the node capacitor Cs1 can be calculated by recording the number of the high levels outputted by the latch Latch. It is judged according to the determined capacitance value of the node capacitor Cs1 whether the capacitance value of the node capacitor Cs1 is within the preset threshold rage; if it is not within the preset threshold range, then the touch occurs at the position of the node capacitor Cs1, and the coordinate of the node coordinate Cs1 is the coordinate of the touch point where the touch occurs. After that, the switches Sw1, Sw2 and Sw3 are turned off, and the switch Sw4 is turned on. The node capacitor Cs2 starts to be discharged through the discharging capacitance. Its process is the same as that of the node capacitor Cs1, and thus no further details are provided. Next, the above process keeps repeated by taking the two neighboring touch signal lines as a group, so that the touch scanning process of the entire touch screen can be realized. Since the time for touch scanning two rows changes from two times of charging and two times of discharging into one time of charging and two times of discharging on the whole, the whole process saves almost a half time of charging, and at the same time the charging time for each group of touch signal lines can be increased, which can ensure that the touch screen is capable of having a greater RC delay tolerance, and finally ensures that the touch screen is capable of determining the position of the touch point where the touch occurs correctly.

There are provided the driving method of the touch screen, the touch screen and the display apparatus in the embodiments of the present disclosure. The touch signal lines on the touch screen are grouped, at least two touch signal lines are taken as a group, and a node capacitor included in each group of touch signal lines is charged sequentially. After the charging of the node capacitors included in each group of touch signal lines is completed, the node capacitors included in each touch signal line of the group of touch signal lines are discharged through the respective sense signal lines sequentially and capacitance values of respective node capacitors are determined. A coordinate of a touch point on the touch screen is determined according to the determined capacitance value of each node capacitor. In this way, the node capacitors included in a group of touch signal lines on the touch screen are charged simultaneously by taking a group as a unit. Compared with a traditional touch screen that charges the node capacitor in only one touch signal line at each time, the present disclosure can save the charging time of the touch signal lines on the entire touch screen effectively, meanwhile can increase the charging time of each group of touch signal lines, and further can increase the charging time of the node capacitor included in each touch signal line, so that the touch screen is capable of tolerating a greater RC delay value, and thus it is ensured the touch screen is capable of determining the position of the touch point correctly.

Obviously, those skilled in the art can make various alternations and modifications to the present disclosure without departing from the spirit and scope of the present disclosure. As such, if these alternations and modifications of the present disclosure fall into the scope of the Claims of the present disclosure and their equivalent technology, then the present disclosure intends to include these alternations and modifications.

The present application claims the priority of a Chinese patent application No. 201410802572.1 filed on Dec. 18, 2014. Herein, the content disclosed by the Chinese patent application is incorporated in full by reference as a part of the present disclosure.

What is claimed is:

1. A driving method of a touch screen having a plurality of touch signal lines and sense signal lines arranged crosswise and insulated from each other, and node capacitors formed at overlapping positions of the touch signal lines and the sense signal lines, comprising following steps:
dividing the plurality of the touch signal lines into a number of groups each including at least two touch signal lines and
providing a charging control signal to respective groups sequentially, wherein each of the touch signal lines only belongs to one group;
charging node capacitors included in each group of touch signal lines simultaneously based on the charging control signal;
discharging the node capacitors included in respective touch signal lines of each group of touch signal lines through the respective sense signal lines sequentially and determining capacitance value of respective node capacitors after the charging of the node capacitors included in each group of touch signal lines is completed; and
determining a coordinate of a touch point on the touch screen according to a determined capacitance value of each node capacitor.

2. The driving method according to claim 1, at least two neighboring touch signal lines are divided into a group and the node capacitor included in each group of touch signal lines are charged simultaneously.

3. The driving method according to claim 1, wherein all the touch signal lines of the touch screen aye divided into a group and node capacitors included in all the touch signal lines are charged simultaneously.

4. The driving method according claim 1, wherein a step of after the charging of the node capacitors included in each group of touch signal lines is completed, discharging the node capacitors included in respective touch signal lines of the group of touch signal lines through the respective sense signal lines sequentially and determining a capacitance value of each node capacitor comprises:
after the charging of the node capacitor included in each group of touch signal lines is completed, connecting the node capacitors included in respective touch signal lines of the group of touch signal lines with corresponding sense driving modules through the respective sense signal lines sequentially, recording number of signals outputted by the each sense driving module when each node capacitor is discharged, and determining a capacitance value of each node capacitor according to the number of the signals outputted.

5. The driving method according to claim 4, wherein a step of determining a coordinate of a touch point on the touch screen according to a determined capacitance value of each node capacitor comprises:
judging whether the determined capacitance value of each node capacitor is within a threshold range; and if it is not within the threshold range, determining that a touch occurs at a coordinate position of the node capacitor and outputting the coordinate of the node capacitor wherein the touch occurs as the coordinate of the touch point.

6. A touch screen, comprising: a plurality of touch signal lines and sense signal lines arranged crosswise and insulated from each other; a touch driving module connected to each of the touch signal lines; a sense driving module connected to each of the sense signal lines; and a touch point determining module configured to determine a coordinate of a touch point, wherein
a node capacitor is formed at an overlapping position of the touch signal lines and the sense signal lines;
the touch driving module is configured to divide the plurality of the touch signal lines into a number of groups each including at least two touch signal lines, provide a charging control signal to respective groups sequentially and charge node capacitors included in each group of touch signal lines simultaneously based on the barging control signal, wherein each of the touch signal lines only belongs to one group;
the sense driving module is configured to, after the charging of the node capacitor included in each group of touch signal lines is completed, discharge a node capacitor included in each touch signal line of the group of touch signal lines through the respective sense signal lines sequentially and determine a capacitance value of each node capacitor; and
the touch point determining module is configured to determine a coordinate of a touch point on the touch screen according to a determined capacitance value of each node capacitor.

7. The touch screen according to claim 6, wherein the touch driving module comprises a plurality of touch driving sub-modules each of which is connected to at least two neighboring touch signal lines corresponding thereto respectively;
each of the touch driving sub-modules is configured to charge a node capacitor included in each touch signal line connected.

8. The touch screen according to claim 6, wherein the sense driving module comprises a plurality of sense driving sub-modules corresponding to each node capacitor in each sense signal line one by one;
each of the sense driving sub-modules comprises: a first switch unit, a discharging unit, a comparing unit and a counting unit;
an input terminal of the first switch unit is connected to a corresponding sense signal line, and an output terminal thereof is connected to a first terminal of the discharging unit and a first input terminal of the comparing unit, and the first switch unit is configured to connect the node capacitor and the discharging unit through the sense signal lines when the node capacitor connected to the corresponding sense signal line is discharged, so that the node capacitor charges the discharging unit;
a second terminal of the discharging unit is connected to a low level signal terminal, and a third terminal thereof is connected to an output terminal of the counting unit;
a second input terminal of the comparing unit is connected to a reference voltage terminal, and an output terminal thereof is connected to an input terminal of the counting unit, the comparing unit is configured to control the discharging unit to discharge to a ground and output a signal to the counting unit when a voltage of the charging unit reaches a voltage of the reference voltage terminal;
an output terminal of the counting unit is connected to an input terminal of the touch point determining module, and the counting unit is configured to determine a capacitance value of the node capacitor according to the recorded number of signals outputted by the comparing unit and output a determined capacitance value of the node capacitor to the touch point determining module.

9. The touch screen according to claim 8, wherein the discharging unit comprises: a discharging capacitance, a voltage dividing resistance and a second switch unit;
one terminal of the discharging capacitance is connected to the output terminal of the first switch unit, the first input terminal of the comparing unit and one terminal of the voltage dividing resistance, and the other terminal thereof is connected to the low level signal terminal;
the other terminal of the voltage dividing resistance is connected to a first terminal of the second switch unit;
a second terminal of the second switch unit is connected to the output terminal of the counting terminal, and a third terminal thereof is connected to the low level signal terminal, and the second switch unit is configured to connect one terminal of the voltage dividing resistance and the output terminal of the counting unit when the node capacitor is discharged and connect one terminal of the voltage dividing resistance and the low level signal terminal when the discharging unit is reset.

10. The touch screen according to claim 6, wherein the touch point determining module is configured to judge whether the determined capacitance value of each node capacitor is within a threshold range; and if it is not within the threshold range, then determining that a touch occurs at a coordinate position of the node capacitor and outputting a coordinate of the node capacitor where the touch occurs as a coordinate of the touch point.

11. A display apparatus, comprising the touch screen according claim 6.

12. The driving method according claim 2, wherein a step of after the charging of the node capacitors included in each group of touch signal lines is completed, discharging the node capacitors included in respective touch signal lines of the group of touch signal lines through the respective sense signal lines sequentially and determining a capacitance value of each node capacitor comprises:
after the charging of the node capacitor included in each group of touch signal lines is completed, connecting the node capacitors included in respective touch signal lines of the group of touch signal lines with corresponding sense driving modules through the respective sense signal lines sequentially, recording number of signals outputted by the each sense driving module when each node capacitor is discharged, and determining a capacitance value of each node capacitor according to the number of the signals outputted.

13. The driving method according claim 3, wherein a step of after the charging of the node capacitors included in each group of touch signal lines is completed, discharging the node capacitors included in respective touch signal lines of the group of touch signal lines through the respective sense signal lines sequentially and determining a capacitance value of each node capacitor comprises:
after the charging of the node capacitor included in each group of touch signal lines is completed, connecting the node capacitors included in respective touch signal lines of the group of touch signal lines with corresponding sense driving modules through the respective sense signal lines sequentially, recording number of signals outputted by the each sense driving module when each node capacitor is discharged, and determining a capacitance value of each node capacitor according to the number of the signals outputted.

14. The touch screen according to claim 7, wherein the touch point determining module is configured to judge whether the determined capacitance value of each node capacitor is within a threshold range; and if it is not within the threshold range, then determining that a touch occurs at a coordinate position of the node capacitor and outputting a coordinate of the node capacitor where the touch occurs as a coordinate of the touch point.

15. The touch screen according to claim 8, wherein the touch point determining module is configured to judge whether the determined capacitance value of each node capacitor is within a threshold range; and if it is not within the threshold range, then determining that a touch occurs at a coordinate position of the node capacitor and outputting a coordinate of the node capacitor where the touch occurs as a coordinate of the touch point.

16. The touch screen according to claim 9, wherein the touch point determining module is configured to judge whether the determined capacitance value of each node capacitor is within a threshold range; and if it is not within the threshold range, then determining that a touch occurs at a coordinate position of the node capacitor and outputting a coordinate of the node capacitor where the touch occurs as a coordinate of the touch point.

17. The display apparatus according to claim 11, wherein the touch driving module comprises a plurality of touch driving sub-modules each of which is connected to at least two neighboring touch signal lines corresponding thereto respectively;
  each of the touch driving sub-modules is configured to charge a node capacitor included in each touch signal line connected.

18. The display apparatus according to claim 11, wherein the sense driving module comprises a plurality of sense driving sub-modules corresponding to each node capacitor in each sense signal line one by one;
  each of the sense driving sub-modules comprises: a first switch unit, a discharging unit, a comparing unit and a counting unit;
  an input terminal of the first switch unit is connected to a corresponding sense signal one, and an output terminal thereof is connected to a first terminal of the discharging unit and a first input terminal of the comparing unit, and the first switch unit is configured to connect the node capacitor and the discharging unit through the sense signal lines when the node capacitor connected to the corresponding sense signal line is discharged, so that the node capacitor charges the discharging unit;
  a second terminal of the discharging unit is connected to a low level signal terminal, and a third terminal thereof is connected to an output terminal of the counting unit;
  a second input terminal of the comparing unit is connected to a reference voltage terminal, and an output terminal thereof is connected to an input terminal of the counting unit, the comparing unit is configured to control the discharging unit to discharge to a ground and output a signal to the counting unit when a voltage of the charging unit reaches a voltage of the reference voltage terminal;
  an output terminal of the counting unit is connected to an input terminal of the touch point determining module, and the counting unit is configured to determine a capacitance value of the node capacitor according to the recorded number of signals outputted by the comparing unit and output a determined capacitance value of the node capacitor to the touch point determining module.

19. The display apparatus according to claim 18, wherein the discharging unit comprises: a discharging capacitance, a voltage dividing resistance and a second switch unit;
  one terminal of the discharging capacitance is connected to the output terminal of the first switch unit, the first input terminal of the comparing unit and one terminal of the voltage dividing resistance, and the other terminal thereof is connected to the low level signal terminal;
  the other terminal of the voltage dividing resistance is connected to a first terminal of the second switch unit;
  a second terminal of the second switch unit is connected to the output terminal of the counting terminal, and a third terminal thereof is connected to the low level signal terminal, and the second switch unit is configured to connect one terminal of the voltage dividing resistance and the output terminal of the counting unit when the node capacitor is discharged and connect one terminal of the voltage dividing resistance and the low level signal terminal when the discharging unit is reset.

20. The display apparatus according to claim 11, wherein the touch point determining module is configured to judge whether the determined capacitance value of each node capacitor is within a threshold range; and if it is not within the threshold range, then determining that a touch occurs at a coordinate position of the node capacitor and outputting a coordinate of the node capacitor where the touch occurs as a coordinate of the touch point.

* * * * *